United States Patent [19]
Bahuguna

[11] Patent Number: 5,892,599
[45] Date of Patent: *Apr. 6, 1999

[54] MINIATURE FINGERPRINT SENSOR USING A TRAPEZOIDAL PRISM AND A HOLOGRAPHIC OPTICAL ELEMENT

[75] Inventor: Ramendra D. Bahuguna, San Jose, Calif.

[73] Assignee: Advanced Precision Technology, Inc., San Francisco, Calif.

[ * ] Notice: The term of this patent shall not extend beyond the expiration date of Pat. No. 5,629.764.

[21] Appl. No.: 694,671

[22] Filed: Aug. 9, 1996

Related U.S. Application Data

[63] Continuation-in-part of Ser. No. 499,673, Jul. 7, 1995, Pat. No. 5,629,764.

[51] Int. Cl.$^6$ ............................................. G02B 5/32
[52] U.S. Cl. ............................ 359/15; 359/19; 356/71; 382/127
[58] Field of Search ............................ 359/1, 2, 15, 19; 356/71; 382/124, 125, 127

[56] References Cited

U.S. PATENT DOCUMENTS

| | | | |
|---|---|---|---|
| 5,051,576 | 9/1991 | Schiller | 356/71 |
| 5,109,427 | 4/1992 | Yang | 359/15 |
| 5,629,764 | 5/1997 | Bahuguna et al. | 356/71 |

*Primary Examiner*—Jon W. Henry
*Assistant Examiner*—Darren E. Schuberg
*Attorney, Agent, or Firm*—David E. Newhouse, Esq.

[57] ABSTRACT

A miniaturized fingerprint sensor has a holographic phase grating glued to a base surface of a trapezoidal prism which operates on light totally internally reflecting from a finger-coverslip interface protecting the exterior surface of the grating, diffracting the reflected light to propagate back through the base surface and out the top parallel surface of the prism in a converging beam having an optical axis normally oriented (⊥) with respect to such parallel base and top surfaces of the prism. A mirror folds the emerging converging light beam directing it into a camera system. The converging light beam emerging from the top surface of the trapezoidal prism contains high contrast, detailed images of ridges, valleys and pores of a finger-surface interface oriented in a plane normal to the optical axis. The holographic phase grating diffracting reflected light from the finger-surface interface into a converging light beam not only eliminates image distortion due dimensional compression, and aberrations, but also eliminates 'hot spots' in the reduced image before capture. The converging beam from the holographic phase grating also allows shorter optical lengths and significant dimensional miniaturization of such sensors. Fingerprint images of a quality that allows resolution of pores on the finger surface ridges are reliably obtained making the invented fingerprint sensor ideally suited for providing input to fingerprint recording, recognition and verification systems.

17 Claims, 2 Drawing Sheets

MINIATURE FINGERPRINT SENSOR USING A TRAPEZOIDAL PRISM AND A HOLOGRAPHIC OPTICAL ELEMENT

RELATED APPLICATIONS

This application is a continuation-in-part of application Ser. No. 08/499,673 filed Jul. 7, 1995 in the United States of America by RAMENDRA D. BAHUGUNA and THOMAS M. CORBOLINE entitled "A PRISM FINGERPRINT SENSOR USING A HOLOGRAPHIC OPTICAL ELEMENT", now U.S. Pat. No. 5,629,764 issued May 13, 1997.

BACKGROUND OF THE INVENTION

1. Field of the Invention

The invention relates to generation and capture of high contrast, detailed optical fingerprint images, and in particular, to a miniaturized optical sensor combining a trapezoidal right angle prism with a holographic phase grating to produce a fingerprint image without dimensional or spatial distortion. The invention further relates to a method of constructing the holographic phase gratings for the invented miniaturized fingerprint sensor.

1. Description of the Prior Art

Total internal reflection has been used for a long time to optically sense ridges and valleys of a finger surface, i.e., to optically capture a fingerprint. H. J. Caulfield and D. R. Perkins, (Caulfield et al) in U.S. Pat. No. 3,716,301 teaches the use of a prism sensor based on total internal reflection in their holographic finger print recognition system. S. Igaki, S Eguchi, F. Yamagishi, H. Ikeda and T. Inagaki (Igaki et. al.) in a paper published in *Applied Optics*, Vol. 31, pp. 1794–1802 (1955), disclose a parallel plate sensor using total internal reflection in a flat glass plate to transport a captured fingerprint image in combination with a holographic grating both which retrieve the image reflecting within the plate and which corrects to a degree for dimensional aberration in that image. The device described by Igaki et. al. works in a scattering mode rather than absorption. Accordingly, image contrast is reversed with respect to that obtained by Caulfield et al., and a pair of cylindrical lenses are required for correcting astigmatism in the captured image.

More recently, M. Metz, C. Flatow, Z. Coleman and N. J. Phillips (M. Metz et. al.) have developed an edge lit hologram for capturing a fingerprint images not based on total internal reflection.[See *Laser Focus World*, May, 1994, pp. 159–163 and a paper entitled "The Use Of Edge-lit Holograms For Compact Fingerprint Capture" published in the *Conference Proceedings of "Card-Tech Secure-Tech 1995"* held Apr. 10–13, 1995, in Washington D.C., pp. 221–228.

The primary disadvantage of existing prism fingerprint sensors is that the fingerprint is compressed in one orthogonal dimension with respect to the other by a factor equal to the cosine of the angle at which the image plane is inclined relative to the normal. To explain, any image in a plane viewed at an angle 45° to the normal is compressed in one dimension by cos. (45°), i.e. by $1/\sqrt{2}$. [Right angle isosceles (45°) prisms are typically described for obtaining fingerprint images.]

Another serious drawback of existing prism fingerprint sensors is that the image plane of the fingerprint emerges from the various sensors inclined with respect to the optical axis. Accordingly, it usually necessary to optically and/or computationally reorient the image to a plane normal ($\perp$) to the optical axis for optimal resolution.

The glass plate sensor of S. Igaki et al utilizes a holographic grating to diffract internally reflected light propagating within a glass plate at an angle greater than the critical angle so that the wave can emerge from the plate into the air. S. Igaki et al specifically point out that to create such a grating, one of the two interfering light waves for constructing the hologram must meet the conditions of total internal reflection, that is light cannot enter the holographic recording plate from the air. S. Igaki et al then describe a complicated procedure for creating a suitable holographic grating involving a different wavelength of light. Finally, the glass plate holographic grating sensor described by S. Igaki et al has astigmatism because the spherically divergent waveforms scattered from a fingerprint ridges are diffracted by fringe planes of a holographic grating creating by planar waveforms.

In co-pending U.S. application Ser. No. 08/499,673 filed Jul. 7, 1995 entitled "A PRISM FINGERPRINT SENSOR USING A HOLOGRAPHIC OPTICAL ELEMENT", the Applicant and Thomas M. Corboline describe a fingerprint sensor which includes a holographic phase grating optically coupled with and forming a right angle surface of a prism which diffracts light totally internally reflecting from its external surface to propagate normally ($\perp$) back into the prism. In the areas where the ridges of the finger surface are in contact with the grating surface the illuminating light is refracted and absorbed. In the areas corresponding to valleys and pores of the finger surface not in contact with the grating surface, the illuminating light is totally internally reflected. The reflected light is diffracted by the holographic phase grating and emerges from the transmission surface of the prism producing a high contrast, detailed image of the ridges, pores and valleys of the finger surface sensor surface interface oriented in a plane normal to the optical axis. The particular advantage conferred is that the holographic phase grating eliminates image distortion due to dimensional compression. And, because the waveform of the image within and emerging from the invented sensor is planar, there is no necessity for additional optics, other than a good camera lens, to correct image aberrations before recording the image electronically or in film. Nor is there any necessity for optically or computationally correcting or enhancing the recorded images thereafter.

However, the light emerging from the invented sensor with the fingerprint image from the transmission surface of the prism is more or less collimated. For most applications the image must therefore be converged or imaged upon, for example, a ⅓ inch diagonal CCD light sensitive surface using a lens. If the converging/imaging lens is placed close to the transmission surface of the prism, not all the light rays reflected from the grating surface are captured and converged. As a result, the image is brighter in its central region than its periphery causing a hot spot. Such phenomena effectively limits the extent to which the invented sensor with collimated light output can be miniaturized.

SUMMARY OF THE INVENTION

The invented miniature fingerprint sensor includes a holographic phase grating optically coupled with and forming a base surface of a trapezoidal prism which diffracts totally internally reflected light from its external surface back into the trapezoidal prism as a converging beam. The base surface of the trapezoidal prism is illuminated by light directed into the prism via one of its slanted sides surfaces. The reflected converging beam emerges from a top, parallel transmission surface of the prism and is captured by camera/sensor optics for imaging images present in such totally internally reflected light.

The holographic phase grating for the invented miniaturized sensor is recorded by exposing a holographic plate optically coupled to the base surface of a trapezoidal prism using a first beam from collimated laser light source split by amplitude division directed normally into a slanted side surface of the trapezoidal prism to the plate, and a second beam from the collimated laser light source expanded and converged by a lens to a diverging point source of light located normally above the parallel top surface of the trapezoidal prism. Within the holographic plate the respective collimated and diverging incident light beams spilt from the common laser source interfere creating fringe planes. A blackened glass plate optically coupled to the exterior surface of the holographic plate precludes total internal reflection of the first beam directed normally through the slanted side surface of the prism at that exterior surface of the holographic plate and absorbs/attenuates any constructing/interfering incident light beams transmitted by the holographic plate. After exposure, the recorded holographic phase grating is developed then rotated 180° in its plane and recouped (glued by an ultraviolet light curing glue) to a base surface of an identical trapezoidal prism. An extremely thin, transparent coverslip optically coupled with (again glued by an ultraviolet light curing glue) the exterior surface of the developed phase grating protects the exposed surface of the grating.

The primary advantage of the invented miniaturized finger print sensor over that described and disclosed in co-pending parent U.S. application Ser. No. 08/499,673 supra, is that the light rays emerging from the trapezoidal prism contain the entire fingerprint image are converging allowing the image capture (camera) optics to be located closer to top transmission surface of the prism without creation of hot spots, loss of image, or image quality, i.e., the converging output beam optically permits dimensional miniaturization of the invented system.

In addition the invented miniaturized fingerprint sensor has all the advantages of the fingerprint sensor described in the co-pending parent U.S. application Ser. No. 08/499,673, supra, namely: (a) emerging fingerprint images free of dimensional distortion, i.e., not elongated or compressed in one orthogonal dimension with respect to the other in the plane of the image; and (b) the waveforms of the fingerprint images are planar and perpendicular relative to the optical axis. Accordingly, fingerprint images generated from the invented miniaturized fingerprint sensor require neither optical nor computational correction of dimensional aberration or astigmatism before capture or recording on film or electronically.

An important aspect of the invented sensor is that both white or appropriate LED light sources, collimated or partially diffuse, (preferably filtered) can be used to illuminate the sensor-finger surface interface through the trapezoidal prism. With diffuse laser-illumination, the diffuser should be rotated at a rate sufficient to average speckling out.

As with the fingerprint sensor of the parent application, images of latent fingerprints left on the sensing surface of the prism from previous use of the sensor are substantially eliminated by providing a diffuse illumination light source, preferably a LED emitting light at a wavelength close to that of the laser used to create the holographic phase grating in combination with a collimating Fresnel lens. The light emission surface of the LED is ground to partially diffuse the emitted light. The Fresnel lens is oriented with grooves facing the slant input side surface of the trapezoidal prism.

Most importantly, the high contrast, detailed output images provided by the invented fingerprint sensor are ideally suited for systems recording, recognizing and verifying fingerprints. In fact, fingerprint images obtainable with the invented sensor are of such quality as to allow true resolution and actual measurement of pore distributions on finger surface ridges.

The quality of the images produced are also ideally suited for video and other electron scanning cameras both for real time display and digitization.

Still other features, aspects, advantages and objects of and provided by the invented combination of a holographic phase grating optically coupled to the base surface of a trapezoidal prism for providing a converging light beam containing high contrast, detailed fingerprint images in a plane oriented normally ($\perp$) to an optical axis utilizing total internal reflection phenomenon will become apparent and/or be more fully understood with reference to the following detailed explanation in context of drawings showing schematic embodiments of components of the respective optical elements thought necessary for simply and reliably producing such images.

DETAILED DESCRIPTION OF PREFERRED AND EXEMPLARY EMBODIMENTS

Applicant's co-pending parent U.S. application Ser. No. 08/499,673 filed Jul. 7, 1995 entitled "A PRISM FINGERPRINT SENSOR USING A HOLOGRAPHIC OPTICAL ELEMENT", with his co-inventor, Thomas M. Corboline present detailed discussions of various details and principals behind the invented fingerprint sensor, and, accordingly, is incorporated by reference into this continuation-in-part application.

Figure 2:
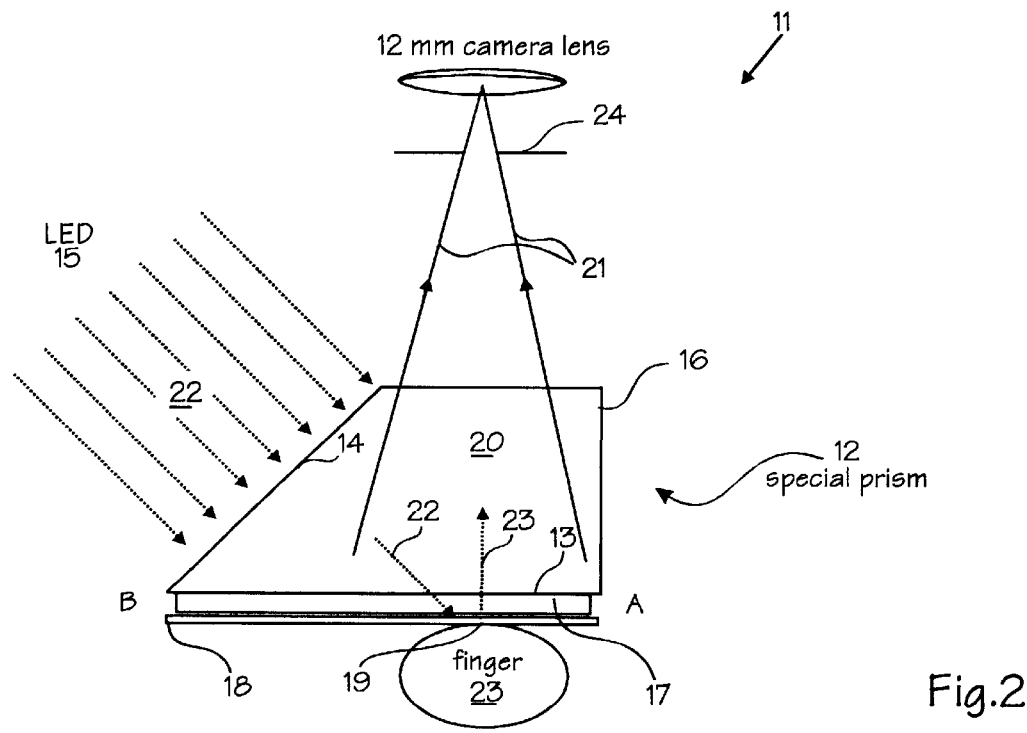
FIG. 2 is a schematic illustration showing the basic optical configuration version of the invented fingerprint sensor with a trapezoidal prism and converging beam diffracting holographic phase grating.
Figure 3:
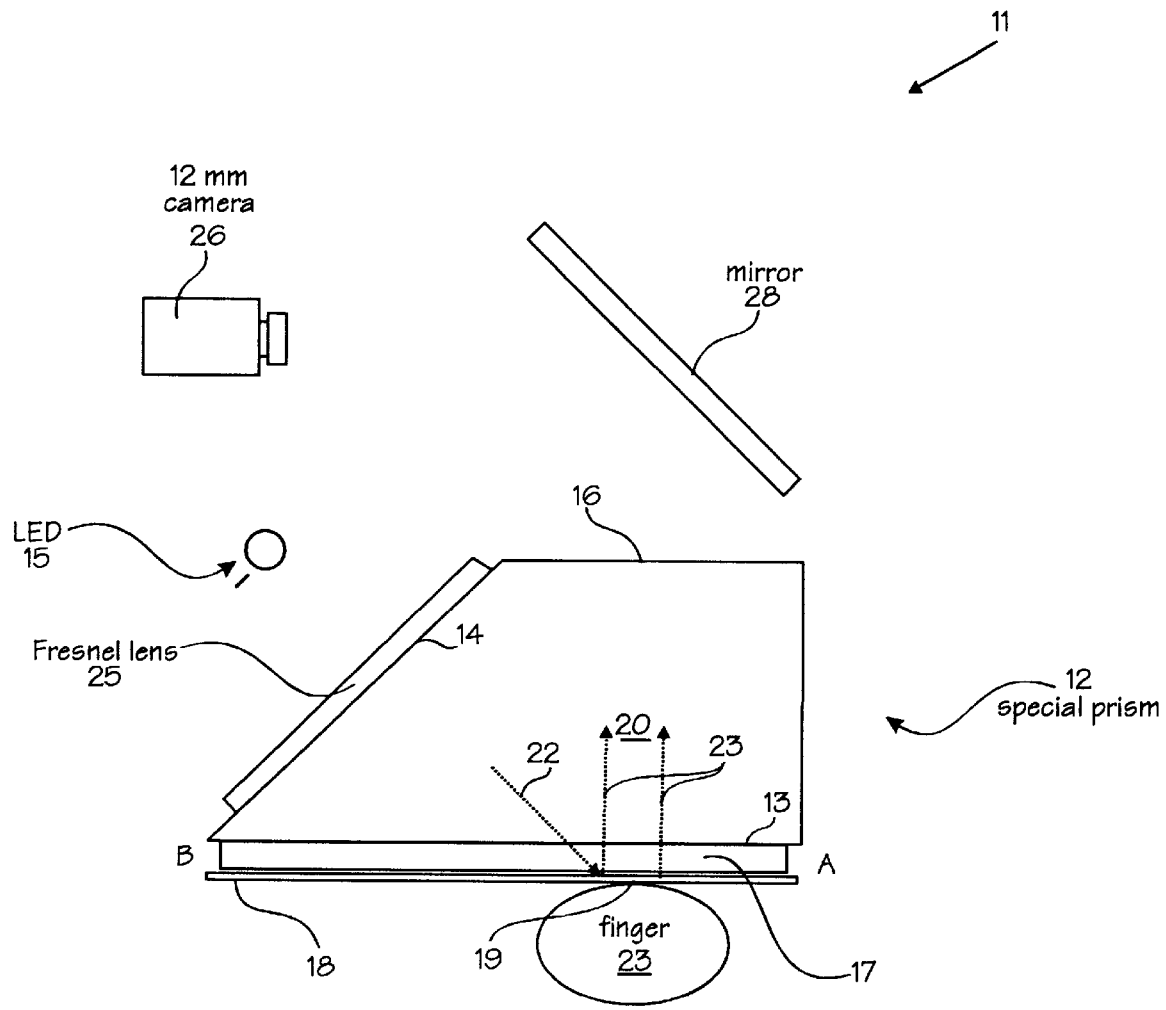
FIG. 3 schematically illustrates a preferred embodiment of the invented miniaturized fingerprint sensor using diffuse LED light source and a Fresnel lens for collimating entrant light input via a slant side surface of a trapezoidal prism.

Looking at FIGS. 2 & 3, the invented miniaturized fingerprint sensor 11 includes a trapezoidal prism 12 with a base surface 13, an angled or slanted side light input surface 14 and top transmission surface 16 parallel to the base surface 13. A holographic phase grating 17 is optically coupled to the base surface 13 of the prism 12 preferably using an ultraviolet light curing transparent adhesive. An extremely thin (approx. 0.01 in. or less) glass coverslip 18 is glued to covering, and protecting the exposed emulsion side of holographic phase grating 17 again using an ultraviolet light curing transparent adhesive. Collimated light indicated by the arrows 22 from an LED light source 15 is input into the prism 12 via its slanted side surface 14. Diffracting fringe planes (not shown) within the phase grating 17 diffract total internally reflected light from the LED light source 15 reflected at the finger-coverslip interface or surface 19 to propagate back through the base surface 13 of the prism 12 as a converging light beam 20 indicated by arrows 21 which has an optical axis normally ($\perp$) oriented relative to that base surface 13 (FIG. 2).

Figure 1:
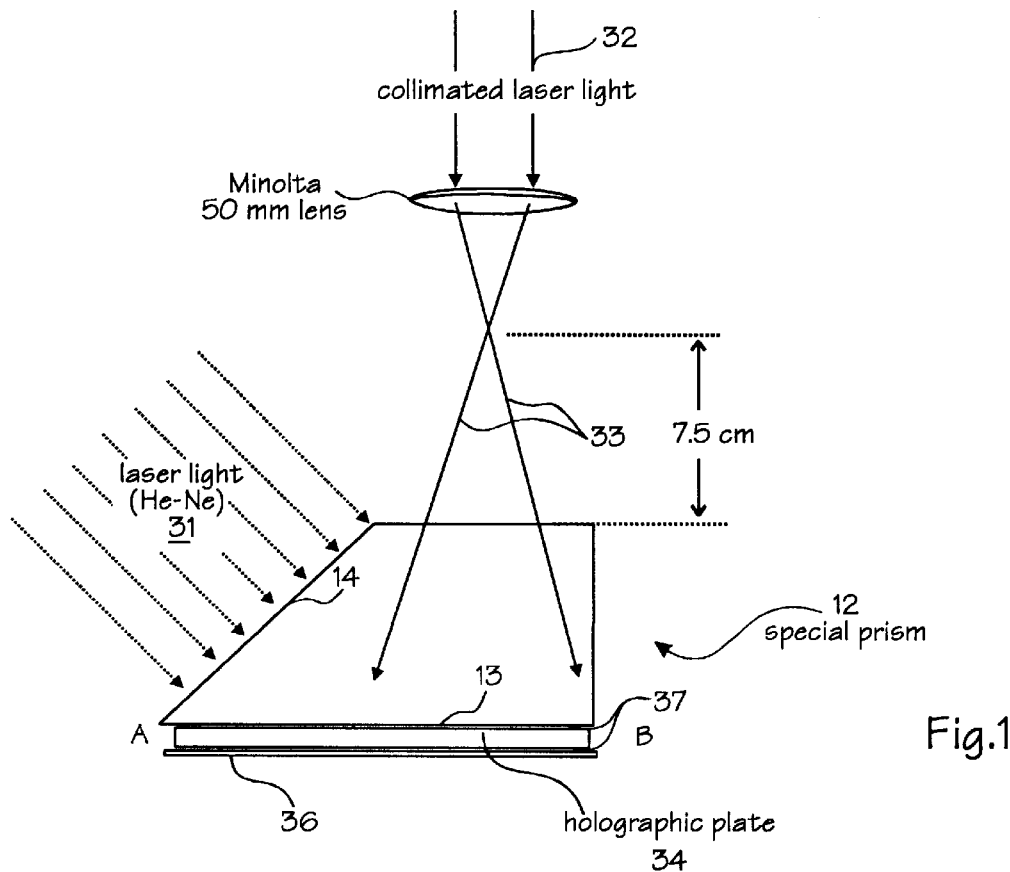
FIG. 1 schematically illustrates the method of recording a holographic phase grating for diffracting totally internally reflected light form a planar surface as a converging light beam.

A suitable holographic phase grating 17 for the invented miniaturized fingerprint sensor 11 can be recorded in several ways. A effective, yet very simple method is illustrated in FIG. 1 where a collimated laser beam (not shown) is split into two constructing laser reference light beams 31 & 32 by amplitude division. One beam 31 is directed to illuminate base surface 13 of the trapezoidal prism 12 via the angled or slanted side light input surface 14 of the prism 12. The other reference constructing beam 32 is expanded and contracted to a point light source located perpendicularly (⊥) above the top parallel transmission surface 16 of the prism 12. From the point source, reference beam 32 illuminates the base surface 13 of the prism 12 with a diverging light beam as indicated by the arrows 33. A holographic plate 34 is placed and maintained in optical contact with the base surface 13 of the prism 12 A blackened bottom glass plate 36 is placed in optical contact with the exposed exterior surface of the holographic plate 34. Layers of isopropyl alcohol 37 or other suitable optically coupling mediums are placed between the respective surfaces. The blackened bottom glass plate 36 eliminates total internal reflection of constructing beam 31 off the exterior surface of the holographic plate 34. The holographic plate 34 is exposed to the two constructing laser beams 31 & 32 for an amount of time to required produce an appropriate optical density. The plate 34 is then developed and bleached to provide the holographic phase grating 17. Care must be taken to ensure that the emulsion thickness of the plate 34 does not change in the chemical processing.

As previously discussed in co-pending parent U.S. application Ser. No. 08/499,673 (supra) the interference fringe planes created in the developed holographic phase grating 17 incline to the left at an angle which bisects the angle between the respective incident constructing beams 31 & 32. However, to diffract light totally internally reflecting off the interior surface of exterior side of the protective coverslip 18 causing it to propagate back through into the base surface 13 of the prism 12 as the reconstructed, but now, converging reference beam 32, the fringe planes of the grating must be inclined to the right at an angle with respect to the normal. In particular, the developed holographic phase grating 17 must be rotated 180° (in its own plane) because only in such a configuration can the reflected light 20 from the finger-coverslip interface 19 be effectively diffracted/redirected in a direction anti-parallel the diverging construction beam 33.

Upon rotation, the developed holographic phase grating 17 is glued using an appropriate optical coupling, adhesive medium to the base surface 13 of the particular or another identical trapezoidal prism 12, thus mitigating if not eliminating the effects of mechanical shocks, and vibration which could otherwise affect the optical orientation of the waveform image in the converging beam emerging from the transmission top surface 16 of the prism 12.

Also, in order to assure optimal optical performance of the combination of elements, i.e., the prism 12, the holographic phase grating 17 and the coverslip, it is recommended that the particular sensor trapezoidal prism 12 be used in creation of its own holographic phase grating 17.

When constructing holographic phase gratings 17 for white light, the angle of incidence of the constructing laser beam 31 should be adjusted in order to assure that, after the grating is rotated and glued to the base surface 13 of the prism, a selected or desired range of light wavelengths are diffracted in a converging beam back into the body of the prism. Also if wavelength of the LED light source 15 is not the same as that of the constructing reference light beams 31 & 32 used to create the phase grating 17, it may be necessary to adjust the lateral position of the point source reference beam 33 for appropriately locating the reference optical axis of the resultant phase grating.

Turning now to FIG. 2 to generate a finger print image with the invented miniaturized fingerprint sensor 11, a finger surface 23 is pressed against the exterior surface of the coverslip 18 as shown. Illuminating light rays 22 from an collimated LED light source 15 is directed through the slanted input surface 14 toward the interface 19 of finger surface 23 and the exterior surface of the coverslip 18. If a laser illumination light source is used, the illuminating light should be the same wavelength as used in constructing the holographic phase grating 17. The illuminating rays 22 hit the base surface 13 of the prism 12 at an angle, and with minimal refraction, propagate into the holographic grating 17, and then again, with minimal refraction, propagate into the coverslip 18. Ideally there should be no refraction or reflection at the respective interfaces between the base surface 13 and phase grating 17 or at the interface of the phase grating 17 and coverslip 18.

In particular, for optimal results, the emulsion chosen to contain the constructed holographic phase grating 17 should have a refractive index the same as or approximately the same as the refractive index of the material composing the prism 12. The coverslip 18 should also have a refractive index as close as possible to that of the prism and the cured emulsion of the holographic phase grating 17. The rays 22 totally internally reflect at the exterior surface of the coverslip 18 where the valleys between and pores in the fingerprint ridges are located. However, light rays 22 incident the interface 19 where fingerprint ridges are in contact with the exterior surface of the coverslip 18 refract through the interface 63 and are, in essence, absorbed. The reflected rays 20 thus carry information from the interface 19 as a high contrast waveform pattern within a converging beam of light 20, the valleys and pores appearing bright (reflected light) and the ridges dark (absorbed light).[See FIGS. 7a & 7b of parent U.S. application Ser. No. 08/499,673 (supra)]

The totally internally reflected rays 23 containing the image are diffracted by the fringe planes of the holographic grating 17 and are directed back through the base surface 13 of prism 12 rotating the plane of the contained image to an orientation parallel that of the base surface 13. The reflected rays 23 emerge as a converging light beam 20 from the top parallel transmission surface 16 of the prism 12. An iris 24 of an optical image capture system such as a video or film camera 26 (FIG. 3) is positioned for capturing the converging light beam 20 for transforming and/or recording the fingerprint image contained within the light beam.

Referring to FIG. 3, the components of a preferred embodiment of the invented miniaturized fingerprint sensor 11 include an LED light source 15 having a 'ground' or light diffuser emission surface. A lens collimator 25 is secured to the slanted side input surface 14 of the trapezoidal prism 12 with the grooves preferably facing inward toward the input surface 14 of the prism 12 with an air gap between the lens 25 and the input surface 14. Partially diffused light rays 22 collimated by the lens 25 illuminates the interface 19 of the finger surface 23 and coverslip 18. Partially diffused rays incident on the interface at angles greater than the critical angle for total internal reflection reflect except where the fingerprint ridges contact the surface. All other rays of the diffused light partially reflect from and partially refract through the exterior surface of the coverslip 18. Refracted light exits through the coverslip 18 and is lost. The fringe planes of the holographic phase grating 17 diffract the total internally reflected light rays rotating or redirecting them into a converging light beam 20 having an optical axis normally (⊥) oriented relative to the base surface 13 of the prism 12. The remaining reflected rays are also diffracted by the holographic phase grating 17 but are directed at different angles than that of a reconstructed diverging reference (now converging) light beam 33 which has an optical axis normally incident the base surface 13 of the prism 12. The optical axis of converging (total internally reflected) light beam 20 emerges normally (⊥) out the top parallel transmission) surface 16 of the prism 12. The other light rays reflected from the exterior surface of the coverslip 18 (unwanted light) reaching the top parallel surface 16 will either refract out or internally reflect and attenuate within the prism 12. In either case, such unwanted light rays are not directed to converge along the optical axis of the converging beam 20 of total internally reflected light containing the fingerprint. A mirror 28 folds the converging beam 20 ninety degrees (90°) directing it back into an iris (not shown) of a 12 mm camera 26 positioned along side the LED light source 15.

The iris 24 (See FIG. 2) of the camera 26 also functions to limit or prevent off axis light refracted and radiating from the top surface 16 of the prism 12 from contaminating the recording of the fingerprint image. The emission surface of the LED 15 is ground to partially diffuse the emitted light, otherwise the Fresnel lens 25 imposes or overlays a ring structure in the captured image of the fingerprint. The resultant fingerprint image has less detail than that obtainable using a collimated light source (See FIG. 2) of the same wavelength as the reference light beams 31 & 32 used constructing the holographic phase grating 14. In the latter instance, fingerprint images can be obtained in which pores on fingerprint ridges are distinctly visible and mappable. However, as previously explained, a diffuse light source has advantages of mitigating diffraction patterns due to streaks and latent fingerprint images left on the exterior surface of the coverslip 18 by previous users.

The invented miniaturized fingerprint sensor and method for constructing the associated holographic phase grating has been described in context of both representative and preferred embodiments. Many modifications and variations can be made to the invented miniaturized fingerprint sensor which, while not exactly described herein, fall within the spirit and the scope of invention as described and set forth in the appended claims.

We claim:

1. A fingerprint sensor for generating a light waveform image of finger surface ridges, comprising, in combination,
   a) a trapezoid prism having a base surface, at least one slanted side input surface and a top transmission surface parallel its base surface,
   b) a flat holographic phase grating having an one flat surface optically coupled with the base surface of the prism and an exterior surface;
   c) a thin transparent coverslip optically coupled with, covering and protecting the exterior surface of the holographic phase grating presenting a surface upon which a finger may be pressed to provide a finger-surface interface which both reflects and transmits light, the holographic phase grating diffracting illuminating light totally internally reflecting from the finger-surface interface to propagate as a converging light beam having an axis normally oriented (⊥) with respect to the base and top transmission surfaces of the prism;
   d) a source of light for illuminating the finger-surface interface through the slanted side input surface of the prism, the illuminating light being refracted and absorbed in areas where finger surface ridges are in contact with the transparent coverslip, and being totally internally reflected in areas corresponding to valleys between and pores in the finger surface ridges not in contact with transparent coverslip, whereby the total internally reflected light from the finger-surface interface propagates as a converging beam to, through and out the top transmission surface of the trapezoidal prism, the converging beam of light containing a true image of the finger-surface interface wherein the areas corresponding to finger surface ridges in contact with the coverslip are dark, the areas corresponding to valleys between and pores in the finger surface ridges not in contact with the coverslip are bright.

2. The fingerprint sensor of claim 1 wherein the flat holographic phase grating is constructed by a beam of coherent light of a particular wavelength split by amplitude division where a first beam is collimated providing a collimated constructing reference beam and a second beam is expanded and then contracted to provide a diverging constructing reference beam emanating from a point, the collimated and the diverging constructing reference beams being directed for exposing a planar plate of holographic recording medium, constructively and destructively interfering within the holographic recording medium generating interference fringe planes within the recording medium, the exposed holographic recording medium being developed into a flat holographic phase grating, the developed holographic phase grating being rotated 180° in a plane parallel its respective flat surfaces before being optically coupled to the base surface of the trapezoid prism.

3. The fingerprint sensor of claim 2 wherein the source of light illuminating the finger-surface interface is collimated and has the same wavelength as the constructing reference beams of coherent light.

4. The fingerprint sensor of claim 2 wherein the source of light illuminating the finger-surface interface is a collimated source of white light.

5. The fingerprint sensor of claim 2 wherein the source of light illuminating the finger-surface interface is a collimated source from a light emitting diode (LED) emitting light having approximately the same wavelengths as the constructing reference beams of the holographic phase grating.

6. The fingerprint sensor of claim 5 wherein a Fresnel lens having greater than one hundred grooves per inch is located optically between the light emitting diode (LED) and the slanted side input surface of the trapezoidal prism for collimating the diffused illuminating light.

7. The fingerprint sensor of claim 5 wherein the LED has a light diffusing emission surface, and including a Fresnel lens having grooves on one surface facing the slanted side input surface of the trapezoid prism.

8. The fingerprint sensor of claim 1 or 7 wherein the coverslip has a thickness of, at most, 0.01 inches.

9. The fingerprint sensor of claim 7 wherein the trapezoid prism, the holographic phase grating and the thin coverslip each exhibit essentially the same index of refraction to light of wavelengths of the source of light used for illuminating the finger-surface interface.

10. The fingerprint sensor of claim 2 wherein the collimated constructing reference beam is directed into a slanted side input surface of a trapezoidal recording prism, and the diverging constructing reference beam is directed into a top transmission surface of the recording prism, and the planar holographic recording medium is optically coupled to a base surface of the trapezoidal recording prism parallel its top transmission surface, and further including means for assuring refraction of all incident light through the plate of holographic recording medium.

11. The fingerprint sensor of claim 9 wherein the trapezoidal recording prism is essentially identical to the trapezoidal prism.

12. The fingerprint sensor of claim 9 wherein the trapezoid prism is also used for recording the holographic phase grating.

13. The fingerprint sensor of claim 11 or 12 wherein the diverging constructing reference beam has an optical axis perpendicular to the top transmission surface of the trapezoidal recording prism, and wherein the angle of incidence of the collimated constructing reference beam within the holographic recording medium is adjusted for generating fringe planes within the developed holographic phase grating, upon being rotated 180° in its plane, for diffracting a specific range of wavelengths of a white light source illuminating the finger-surface interface via the slanted side input surface totally internally reflected from that interface into a converging beam of light having an optical axis perpendicular to the base and parallel top transmission surfaces of the trapezoid prism.

14. The fingerprint sensor of claim 10 or 11 wherein the diverging constructing reference beam has an optical axis oriented at an angle which is adjusted relative to the top transmission surface of the trapezoidal recording prism for generating fringe planes in the developed holographic phase grating, upon being rotated 180° in its plane, for diffracting totally internally reflected a wavelength of an LED light source illuminating the finger-surface interface via the slanted side input surface of the trapezoid prism into a converging light beam having an optical axis perpendicular to the parallel base and top transmission surfaces of the trapezoid prism, the LED light source emitting light at a wavelength approximately equal to that of the constructing reference beams used to create the holographic phase grating.

15. The fingerprint sensor of claim 1 or 7 and further including:
   e) a camera means having internal optical components for directing, imaging and recording the image of the finger-surface interface within the converging beam propagating out of the top transmission surface of the trapezoid prism positioned along the optical axis of the converging light beam for capturing the entire image of the finger-surface interface.

16. The fingerprint sensor of claim 15 and further including:
   f) a mirror located for folding the converging light beam propagating out of the top transmission surface of the trapezoid prism directing it into the camera means.

17. In a fingerprint sensor for generating a light image of a fingerprint including (i) a prism having a base transmission surface, at least one slanted side input surface and an output transmission surface, and (ii) a source of light for illuminating a finger-surface interface through the slanted side input surface of the prism, the illuminating light being refracted and absorbed in areas where finger surface ridges are in contact with the finger-surface interface, and being totally internally reflected in areas corresponding to valleys between and pores in the finger surface ridges not in contact with the finger-surface interface, the improvement comprising in combination therewith:
   a) a flat holographic phase grating having one flat surface optically coupled with the base surface of the prism and an exterior flat surface for diffracting illuminating light totally internally reflecting from the finger-surface interface to propagate back into the prism as a shaped light beam having an optical axis oriented at predetermined angles with respect to the base and transmission surfaces of the prism; and
   b) a thin transparent coverslip optically coupled with, covering and protecting the exterior surface of the holographic phase grating presenting a surface upon which a finger may be pressed to provide the finger-surface interface which both reflects and transmits light, whereby, the total internally reflected light from the finger-surface interface propagates as a beam back into, through the base surface of the prism and out the transmission surface of the prism, the shaped beam of light containing a true image of the finger-surface interface wherein the areas corresponding to finger surface ridges in contact with the finger-surface interface are dark, the areas corresponding to valleys between and pores in the finger surface ridges not in contact with the finger-surface interface are bright.

* * * * *